(12) United States Patent
Brocke et al.

(10) Patent No.: US 10,442,147 B2
(45) Date of Patent: Oct. 15, 2019

(54) METHOD FOR PREPARING A TENSION MEMBER, IN PARTICULAR A CARBON TENSION MEMBER, IN THE PRODUCTION OF A BELT

(71) Applicant: ContiTech Antriebssysteme GmbH, Hannover (DE)

(72) Inventors: Stephan Brocke, Hamburg (DE); Hubert Goeser, Dannenberg (DE); Andre Kucharczyk, Guelden (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 865 days.

(21) Appl. No.: 14/268,231

(22) Filed: May 2, 2014

(65) Prior Publication Data

US 2014/0238581 A1  Aug. 28, 2014

Related U.S. Application Data

(63) Continuation of application No. PCT/EP2012/071205, filed on Oct. 26, 2012.

(30) Foreign Application Priority Data

Nov. 2, 2011 (DE) .................. 10 2011 054 976

(51) Int. Cl.
  *B29B 15/12*  (2006.01)
  *B29D 29/08*  (2006.01)
  (Continued)

(52) U.S. Cl.
  CPC .......... *B29D 29/103* (2013.01); *B29D 29/08* (2013.01); *D06M 15/564* (2013.01); *F16G 1/10* (2013.01);
  (Continued)

(58) Field of Classification Search
  CPC ...... B29B 15/122; B29D 29/08; B29D 29/10; B29L 2013/7094; C08J 3/2053;
  (Continued)

(56) References Cited

U.S. PATENT DOCUMENTS 3,278,667 A * 10/1966 Knox .................... B29C 43/22
                                              219/69.18
3,981,206 A   9/1976 Miranti, Jr. et al.
(Continued)

FOREIGN PATENT DOCUMENTS

DE        38 23 157 A1    2/1990
DE    10 2007 062 285 A1  6/2009
(Continued)

OTHER PUBLICATIONS

Full Translation of JP 2001-226876 A to Watanabe obtained from USPTO Scientific and Technical Information Center. Dated Feb. 2017.*

(Continued)

*Primary Examiner* — Michael A Tolin

(57) ABSTRACT

A method for treating a tension member in the production of a belt. The belt includes at least a belt body made of a polymer material having elastic properties, a cover layer as a belt backing, and a substructure having a force-transmission zone. The tension member has a ribbed design and is embedded in the belt body. The tension member is treated with an overall treatment mixture which forms a cross-linked polymer that on the one hand enters into a mechanical connection with the tension member and on the other hand forms an adhesive connection with the belt body.

8 Claims, 1 Drawing Sheet

(51) Int. Cl.

| | | |
|---|---|---|
| *D06M 15/564* | (2006.01) | |
| *F16G 1/16* | (2006.01) | |
| *F16G 1/28* | (2006.01) | |
| *F16G 5/06* | (2006.01) | |
| *F16G 5/20* | (2006.01) | |
| *B29D 29/10* | (2006.01) | |
| *F16G 1/10* | (2006.01) | |
| *F16G 5/08* | (2006.01) | |

(52) U.S. Cl.
CPC .............. *F16G 1/16* (2013.01); *F16G 1/28* (2013.01); *F16G 5/06* (2013.01); *F16G 5/08* (2013.01); *F16G 5/20* (2013.01); *B29B 15/122* (2013.01)

(58) Field of Classification Search
CPC ...... C08J 3/215; C09J 175/04; D06M 15/564; F16G 1/08; F16G 1/10; F16G 1/16; F16G 1/28; F16G 5/06; F16G 5/08; F16G 5/14; F16G 5/20; Y10T 428/249936; Y10T 428/249937; Y10T 428/2933
See application file for complete search history.

(56) References Cited

U.S. PATENT DOCUMENTS

| | | | | |
|---|---|---|---|---|
| 4,024,307 | A | * | 5/1977 | Brahm ............... C08G 18/12 427/246 |
| 4,190,687 | A | * | 2/1980 | Sugiura ............... C14C 11/003 427/389 |
| 4,409,055 | A | * | 10/1983 | Elmer ............... C08J 5/06 156/307.5 |
| 4,711,792 | A | | 12/1987 | Long |
| 5,417,618 | A | | 5/1995 | Osako et al. |
| 5,807,194 | A | | 9/1998 | Knutson et al. |
| 6,077,606 | A | | 6/2000 | Gillick et al. |
| 6,350,492 | B1 | | 2/2002 | Gillick et al. |
| 6,358,609 | B2 | | 3/2002 | Kinoshita et al. |
| 6,491,598 | B1 | | 12/2002 | Rosenboom |
| 6,918,849 | B2 | | 7/2005 | Gregg et al. |
| 6,945,891 | B2 | * | 9/2005 | Knutson ............... B29D 29/08 156/137 |
| 7,128,674 | B2 | | 10/2006 | Teves et al. |
| 8,262,523 | B2 | | 9/2012 | Kanzow et al. |
| 2003/0130077 | A1 | | 7/2003 | Knutson |
| 2004/0043213 | A1 | | 3/2004 | Tonon |
| 2008/0032837 | A1 | | 2/2008 | Unruh et al. |
| 2009/0227406 | A1 | | 9/2009 | Wu et al. |
| 2011/0129647 | A1 | | 6/2011 | Duke, Jr. et al. |

FOREIGN PATENT DOCUMENTS

| | | | |
|---|---|---|---|
| DE | 10 2008 012 044 A1 | | 9/2009 |
| DE | 10 2009 044 153 A1 | | 4/2011 |
| EP | 0902046 A2 | | 3/1999 |
| EP | 1429046 A2 | | 6/2004 |
| GB | 2226056 A | | 6/1990 |
| JP | 2001-226876 A | * | 8/2001 |
| JP | 2005-248356 A | | 9/2005 |
| JP | 2010-276175 A | | 12/2010 |
| WO | 2005/080821 A1 | | 9/2005 |

OTHER PUBLICATIONS

U.S. Appl. No. 14/268,249, filed May 2, 2014.
International Search Report dated Feb. 4, 2013 of international application PCT/EP2012/071205 on which this application is based.
Falbe, Prof. Dr. Jürgen / Schlagwort "Prepolymere"—Date of Publication Unknown /MT/ Aug. 27, 2019.
Falbe, Prof. Dr. Jürgen—Römpp Chemie Lexikon Epoxidharze Date of Publication Unknown /MT/ Aug. 27, 2019.
Durairaij, R.B.—Resorcinol Chemistry, Technology and Applications Springer Verlag, Berlin, Heidelberg—relevant: S.263-279,316-321,326-328 Date of Publication Unknown /MT/ Aug. 27, 2019.

* cited by examiner

METHOD FOR PREPARING A TENSION MEMBER, IN PARTICULAR A CARBON TENSION MEMBER, IN THE PRODUCTION OF A BELT

CROSS REFERENCE TO RELATED APPLICATIONS

This application is a continuation application of international patent application PCT/EP2012/071205, filed Oct. 26, 2012, designating the United States and claiming priority from German application 10 2011 054 976.5, filed Nov. 2, 2011, and the entire content of both applications is incorporated herein by reference.

FIELD OF THE INVENTION

The invention relates to a method of treating a tensile member for fabricating a belt comprising at least:
- a belt body composed of a polymeric material having elastic properties and comprising a top ply as belt backing and a substructure having a power transmission zone; and also
- a tensile member embedded in the belt body and being in cord construction, wherein the tensile member has been treated with a crosslinked polymer which forms both a mechanical attachment to the tensile member and an adherent bond with the belt body.

BACKGROUND OF THE INVENTION

A belt of the abovementioned type plays a prominent part in drive technology in particular. Such belts, which are also known as drive belts or power transmission belts, can be configured as flat belts, V-belts, V-ribbed belts, toothed belts or as composite cables. The power transmission zone corresponds to the belt drive. The following patent literature in particular is referenced in this regard: DE 38 23 157 A1; U.S. Pat. No. 7,128,674; U.S. Pat. No. 8,262,523; DE 10 2007 062 285 A1; DE 10 2008 012 044 A1; DE 10 2009 044 153 A1; U.S. Pat. No. 5,807,194; WO 2005/080821 A1; US 2008/0032837; US 2011/0129647; U.S. Pat. Nos. 3,981,206; 5,417,618; and, 6,491,598.

It is further known to use belts to convey materials, belts of this type also being referred to as transport belts or conveyor belts. The top ply serving as belt backing here would then be the carrying-side cover in contact with the conveyed material. The substructure would then in turn be the return-side cover, which is in contact with a driving drum.

An elastic belt is elastic because the belt body and thus the top ply and the substructure comprise a polymeric material having elastic properties, suitable materials here being in particular the two groups known as elastomers and thermoplastic elastomers. Elastomers based on a crosslinked mixture of rubber are particularly important, the mixture containing at least a rubber component and mixture ingredients. The rubber component used is more particularly ethylene-propylene rubber (EPM), ethylene-propylene-diene monomer rubber (EPDM), (partially) hydrogenated nitrile rubber (HNBR), fluoro rubber (FKM), natural rubber (NR), chloroprene rubber (CR), styrene-butadiene rubber (SBR), butadiene rubber (BR) or polyurethane (PU), which are cut with at least a further rubber component, in particular with one of the aforementioned types of rubber, for example in the form of an EPM/EPDM or SBR/BR blend, or uncut. HNBR, EPM, EPDM, PU or an EPM/EPDM blend are particularly important here. The mixture ingredients comprise at least a crosslinker or crosslinker system (crosslinking agent plus accelerant). Further mixture ingredients are usually also a filler and/or a processing aid and/or a plasticizer and/or an antioxidant and also optionally further added substances, for example fibers for reinforcement and color pigments. The general rubber-mixing arts are referenced in this regard.

The belt comprises an embedded tensile member which is formed of at least a tensile strand extending in belt longitudinal direction. Usually, two or more tensile strands combine to form a tensile member ply. Particular importance attaches here to a tensile strand in cord construction, for which various materials are possible according to the prior art. The essential types of material are: steel, polyamide (PA), aramid, polyester, carbon, basalt, polyetheretherketone (PEEK), polyethylene terephthalate (PET), polybenzoxazole (PBO) or polyethylene 2,6-naphthalate (PEN).

Especially the power transmission zone of a belt for drive technology is endowed with an abrasion-resistant coating which additionally serves as a noise reducer and may also be rendered oil resistant. What is used for this purpose is a flocked add-on ply, in particular in the form of a cotton or aramid flock, a thin elastic polymeric layer filled with fibers (e.g., aramid fibers), a textile add-on ply, in particular in the form of a woven or knitted fabric, or a self-supporting film or sheet (e.g., a PTFE film or sheet) or a composite film or sheet (e.g., a PA-PTFE film or sheet). The woven fabric is of particular importance. The coatings listed here are usually treated on the contact side to the belt body, in particular to the substructure thereof, in an adherence-promoting manner, for example with a resorcinol-formaldehyde latex (RFL).

The prior art of polyurethane treatment of the tensile member will now be reviewed in more detail.

U.S. Pat. No. 5,807,194 discloses a toothed belt wherein the belt body comprises a cast polyurethane. The embedded tensile member in cord construction is formed of carbon fibers together with a cord treatment. As the belt is cast, only some of the tensile member voids become filled with the cast polyurethane material. The disadvantage is that such a treatment of the tensile member with polyurethane is predicated on the fact that the belt body should likewise consist of a polyurethane of the same composition. No regard is accordingly had to the different properties of the carbon-type tensile member and of the belt body. US 2011/0129647, then, discloses a belt, in particular a toothed belt and a V-ribbed belt, whose tensile member in cord construction, in particular carbon-type tensile member, has been treated with a crosslinked polyurethane. The fillage of the tensile member voids with the crosslinked polyurethane is preferably in the range from 20% to 100%. The polyurethane is further formed the following components A and B in particular:

component A: polyols selected from polyester polyols, polycarbonate polyols and polyether polyols;
component B: diisocyanates, in particular paraphenylene diisocyanate and 4,4'-methylenediphenyl diisocyanate.

A polyol is first reacted with a diisocyanate to form the polyurethane prepolymer, together with a subsequent crosslinking reaction with a diamine and/or with water, in particular only with water. In this connection, a "two-bath concept" is also presented as a method of treating the tensile member as part of an upstream processing stage. The tensile member is dipped into a mixture of a polyurethane prepolymer and an inert solvent/dispersant, the voids in the tensile member becoming at least partially filled with this mixture. This is followed by a drying operation. Finally, a crosslinking reaction with water is carried out. This is followed by the manufacture of the belt using the tensile member thus treated.

The belt body itself may be based on a different material, although the preference is again for using a crosslinked polyurethane which, however, may have a different composition than the polyurethane for the tensile member treatment.

SUMMARY OF THE INVENTION

Seeking to further develop the teaching of US 2011/0129647, then, the problem addressed by the invention is that of providing a method of treating a tensile member to fabricate a belt whereby a reproducible polymeric fillage of the tensile member voids is ensured and hence process consistency is ensured. This method shall further ensure uniform wetting of all tensile member fibers, including the innermost tensile member fibers.

This problem is solved by method versions I or II, which will now be more particularly presented.

Method Version I

The tensile member is wetted with an overall treatment mixture comprising at least a prepolymer, a crosslinker and an inert solvent or dispersant in a single treatment stage in the course of an upstream stage of the belt fabrication process, wherein the overall treatment mixture fills at least some of the tensile member voids, and the treated tensile member is subsequently dried.

While the overall treatment mixture is penetrating into the tensile member voids, a crosslinking reaction is already starting to occur in a way which depends on the conditions (e.g., concentration, temperature), although further crosslinking (to completion) will usually take place in the course of the subsequent drying operation.

Method Version II

The tensile member is also wetted during the course of an upstream stage of the belt fabrication process with an overall treatment mixture comprising at least a prepolymer, a crosslinker, and an inert solvent or dispersant in each of two or more treatment stages, wherein each overall treatment mixture fills at least some of the tensile member voids, and the treated tensile member is subsequently dried.

Every treatment stage can employ the same overall treatment mixture.

It is particularly advantageous for every treatment stage to employ a different overall treatment mixture. This is because different treatment mixtures can serve to further optimize the degree of wetting. More particularly, this version of the method can be used to further enhance the fillage if this cannot be achieved via solvent concentrations.

In addition, a drying operation is performed between every treatment stage.

With regard to the course of crosslinking during filling and drying, reference is made to method version I.

Method versions I and II, which differ from the treatment as taught by US 2011/0129647, both benefit from the following process engineering measures:

The tensile member is wetted such that, after drying, the crosslinked polymer fills at least 20%, in particular at least 30%, of the tensile member voids. Even 100% fillage is possible, in particular according to method version II.

A diol, in particular a butanediol, specifically 1,4-butanediol, is used to crosslink the prepolymer.

The prepolymer employed is a polyurethane prepolymer, for which recourse may be had here for example to the polyols and diisocyanates presented in US 2011/0129647.

Before, in particular directly before, the treatment of the tensile member is started, the individual components of the overall treatment mixture are initially dissolved and/or dispersed independently of each other in a solvent or dispersant, which may be the same (e.g., toluene) or different (e.g., toluene, xylene), and are then combined at the start of the treatment of the tensile member to form a still low-viscosity overall treatment mixture. This still low-viscosity mixture is able to penetrate deep into the fiber bundle in a uniform manner. This ensures wetting of every filament across the cord. Moreover, the chemical reaction of the components is inhibited by the solvent/dispersant. The actual reaction usually only starts in the course of the subsequent drying operation with evaporative removal of the solvent/dispersant.

A tensile member comprising carbon fibers, glass fibers, aramid fibers or basalt fibers is treated. The aramid fibers can be used in the form of para-aramid or meta-aramid. However, tensile member formation from carbon fibers is particularly important.

The degree of penetration by and the amount of the filling material can further be influenced via the following parameters:

viscosity of overall treatment mixture;
mixing ratio of solvent/dispersant to the components;
temperature;
pressure;
residence time;
number of treatment stages (dip passages) in method version II.

The tensile member treated according to either method versions I and II is then used for belt fabrication. Otherwise the prior belt technology art cited is referenced by way of example in respect of belt fabrication.

BRIEF DESCRIPTION OF THE DRAWINGS

The treatments will now be explained with reference to the drawings wherein.

DESCRIPTION OF THE PREFERRED EMBODIMENTS OF THE INVENTION

Figure 1:
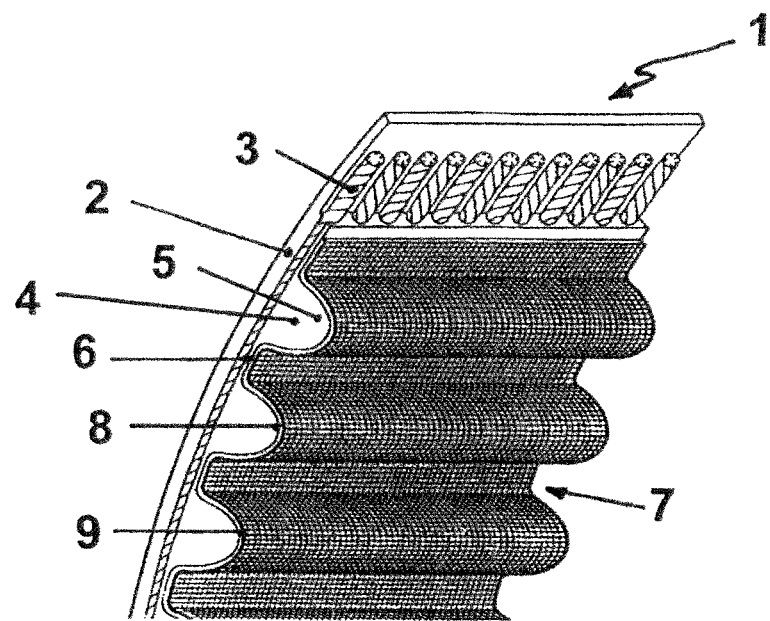
FIG. 1 shows a toothed belt comprising a tensile member PU-treated according to method version I or II.

FIG. 1 shows a belt 1 in the form of a toothed belt having a top ply 2 as belt backing, an embedded tensile member 3 having a plurality of tensile strands extending in belt longitudinal direction in a parallel arrangement, and also a substructure 4. The substructure has a tooth-shaped profile, comprising teeth 5 and indentations 6, and comprises the power transmission zone 7.

The top ply 2 and the substructure 4 combine to form as an overall unit the belt body composed of a polymeric material having elastic properties. With regard to the preferred type of material in this regard, reference is made to the introductory part of the description for the prior art. The use of crosslinked polyurethane is particularly important here.

Figure 2:
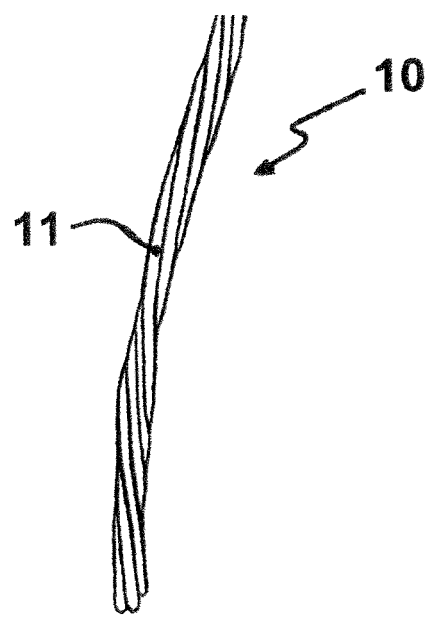
FIG. 2 shows a braid formed from filaments as basis for a cord construction.

The tensile member 3 in cord construction is formed in particular of carbon fibers, while the tensile member is treated with a crosslinked polyurethane, as will be more particularly elucidated in connection with FIG. 2.

The power transmission zone 7 of the belt is particularly susceptible to wear and tear due to abrasion, heat, and the influence of oils. This is why a textile add-on ply 8, for example in the form of a woven fabric, is usually provided to the power transmission zone. This textile add-on ply is, for example as taught in WO 2005/080821 A1, additionally impregnated with a fluorous plastic, which is in particular polytetrafluoroethylene (PTFE), to a high degree of fillage for the plastic, while at the same time a polymer coating (seal) is formed as an additional oil resistant protective layer 9. The two sub-layers 8 and 9 with different functions here occur together as a conjoint protective layer.

A textile add-on ply, for example of the type described above, can also be provided to the top ply 2 of belt 1.

Belt 1 in its exemplary configuration of a toothed belt is particularly useful for driving an oil pump of an engine, for example of an automotive engine.

FIG. 2 shows a braid 10 formed of a group of filaments 11, where 100 to 1000 filaments, in particular 500 to 700 filaments, form one braid. The braid is usually in the form of a braid helix, as is illustrated in FIG. 2. A group of braids finally forms the cord. A cord usually consists of at least five braids, in particular of 10 to 20 braids.

Filaments 11 are formed of one fibrous material, in particular of carbon fibers. Fibrous filaments are also referred to in this context.

The entire cord construction, comprising the overall system of fibers, filaments, and braids, contains voids, namely within the fibers and also between the filaments and braids, which are now at least partially filled with the crosslinked polyurethane in the course of the treatment, and the filling material not only has very good mechanical attachment to the fibrous filaments and thus to the tensile member but also very good chemical attachment to the belt body.

It is understood that the foregoing description is that of the preferred embodiments of the invention and that various changes and modifications may be made thereto without departing from the spirit and scope of the invention as defined in the appended claims.

LIST OF REFERENCE SIGNS (Part of the Description)
1 belt in the form of a toothed belt
2 top ply as belt backing
3 tensile member
4 substructure
5 tooth
6 indentation
7 power transmission zone
8 textile add-on ply (tooth capping)
9 protective layer
10 braid
11 filament

What is claimed is:

1. A method of treating a tensile member for fabricating a belt comprising:
   wetting a tensile member having voids and being in cord construction with an overall treatment mixture including at least a prepolymer, a crosslinker, and at least one of an inert solvent or dispersant in a single treatment stage, thereby filling at least some of the tensile member voids with the overall treatment mixture to form a treated tensile member;
   drying the treated tensile member to form a dried tensile member; and,
   embedding the dried tensile member in a belt body composed of a polymeric material having elastic properties;
   the belt body having a top ply as belt backing and a substructure having a power transmission zone; and,
   the overall treatment mixture forming a crosslinked polymer having both a mechanical attachment to the tensile member and an adherent bond with the belt body,
   wherein a partial crosslinking reaction occurs while the overall treatment mixture is penetrating into the tensile member voids;
   wherein before the treatment of the tensile member is started, the individual components of the overall treatment mixture are initially dissolved and/or dispersed independently of each other in a solvent or dispersant, respectively, which may be the same or different, and are then combined at the start of the treatment of the tensile member to form a still low-viscosity overall treatment mixture.

2. The method as claimed in claim 1, wherein the tensile member is wetted such that, after drying, the crosslinked polymer fills at least 20% of the tensile member voids.

3. The method as claimed in claim 1, wherein a diol is used to crosslink the prepolymer.

4. The method as claimed in claim 3, wherein a butanediol is used to crosslink the prepolymer.

5. The method as claimed in claim 1, wherein a polyurethane prepolymer is employed.

6. The method as claimed in claim 1, wherein the tensile member comprises a fibrous material.

7. The method as claimed in claim 6, wherein the fibrous material is selected from the group consisting of carbon fibers, glass fibers, aramid fibers, and basalt fibers or a mixture thereof.

8. The method as claimed in claim 7, wherein the fibrous material consists of carbon fibers.

* * * * *